United States Patent
Unterreiner et al.

(10) Patent No.: US 7,774,986 B2
(45) Date of Patent: Aug. 17, 2010

(54) PRE-ASSEMBLY UNIT FOR A MOTOR VEHICLE DOOR

(75) Inventors: Klaus Unterreiner, Geisenhausen (DE); Michael Bauer, Muhldorf (DE)

(73) Assignee: Lisa Dräxlmaier GmbH, Vilsbiburg (DE)

( * ) Notice: Subject to any disclaimer, the term of this patent is extended or adjusted under 35 U.S.C. 154(b) by 684 days.

(21) Appl. No.: 11/230,939

(22) Filed: Sep. 20, 2005

(65) Prior Publication Data

US 2006/0064938 A1   Mar. 30, 2006

(30) Foreign Application Priority Data

Sep. 20, 2004   (DE) .................. 10 2004 045 453

(51) Int. Cl.
*B60J 5/04* (2006.01)
(52) U.S. Cl. .................................. 49/502; 49/349
(58) Field of Classification Search .............. 49/502, 49/352, 349; 296/146.5
See application file for complete search history.

(56) References Cited

U.S. PATENT DOCUMENTS

| | | | | |
|---|---|---|---|---|
| 2,304,245 A | * | 12/1942 | Dorries .................... | 91/177 |
| 2,650,857 A | * | 9/1953 | Watter et al. ............... | 49/502 |
| 4,648,208 A | * | 3/1987 | Baldamus et al. .......... | 49/502 |
| 4,827,671 A | * | 5/1989 | Herringshaw et al. ...... | 49/503 |
| 4,845,894 A | * | 7/1989 | Herringshaw et al. ...... | 49/502 |
| 4,923,542 A | * | 5/1990 | Janicki et al. ............. | 156/92 |
| 5,056,264 A | * | 10/1991 | Jewell et al. .............. | 49/502 |
| 5,127,191 A | * | 7/1992 | Ohta ........................ | 49/62 |
| 5,536,060 A | * | 7/1996 | Rashid et al. .......... | 296/146.6 |
| 5,857,732 A | * | 1/1999 | Ritchie ................. | 296/146.5 |
| 6,233,875 B1 | * | 5/2001 | Carlo et al. ............... | 49/502 |
| 6,301,835 B1 | * | 10/2001 | Pfeiffer et al. ............ | 49/502 |
| 6,409,250 B1 | * | 6/2002 | Schultheiss ............. | 296/146.7 |
| 6,449,907 B2 | * | 9/2002 | Nishikawa et al. .......... | 49/502 |
| 6,536,164 B1 | * | 3/2003 | Kirejczyk ................ | 49/502 |
| 6,561,567 B2 | * | 5/2003 | Mrozowski et al. ...... | 296/146.5 |
| 6,688,043 B1 | * | 2/2004 | Feder et al. ............... | 49/352 |

(Continued)

FOREIGN PATENT DOCUMENTS

DE   4426426 A1   2/1996

(Continued)

*Primary Examiner*—Katherine W Mitchell
*Assistant Examiner*—Catherine A Kelly
(74) *Attorney, Agent, or Firm*—Wolf, Greenfield & Sacks, P.C.

(57) ABSTRACT

A pre-assembly unit for a motor vehicle and for connection of such with a door frame of the motor vehicle, comprising a window frame, a side window guided at least within the window frame, a window lifting mechanism, which is joined to the side window in order to raise or lower it, and an equipment carrier connected to but disconnectable from the window frame with a wet side (N) and a dry side (T) for dividing the door frame into a wet and a dry area is provided. At least one fixing means, which joins the window lifting mechanism to the equipment carrier and can be undone from the dry side of the equipment carrier is also provided. At least one assembly preparation is provided on or in the window lifting mechanism, and is accessible from the dry side of the equipment carrier for connecting the window lifting mechanism to the door frame. A corresponding motor vehicle door as well as an assembly and disassembly method is also provided.

14 Claims, 3 Drawing Sheets

U.S. PATENT DOCUMENTS

| | | | |
|---|---|---|---|
| 6,805,397 B1 * | 10/2004 | Chernoff et al. | 296/146.2 |
| 6,823,628 B2 * | 11/2004 | Morrison et al. | 49/502 |
| 6,983,978 B2 * | 1/2006 | Radu et al. | 296/146.7 |
| 7,124,541 B2 * | 10/2006 | Fellner | 49/502 |
| 7,234,756 B2 * | 6/2007 | Lynam et al. | 296/146.5 |
| 2002/0007598 A1 * | 1/2002 | Nishikawa et al. | 49/502 |
| 2002/0134025 A1 * | 9/2002 | Lawrie et al. | 49/502 |
| 2003/0097797 A1 * | 5/2003 | Cucchiara et al. | 49/502 |
| 2003/0097798 A1 * | 5/2003 | Staser | 49/502 |
| 2003/0140566 A1 | 7/2003 | Summer et al. | |
| 2004/0012226 A1 * | 1/2004 | Morrison et al. | 296/146.5 |
| 2004/0049988 A1 * | 3/2004 | Reul et al. | 49/502 |
| 2004/0098922 A1 * | 5/2004 | Nakagawa | 49/502 |
| 2005/0016071 A1 * | 1/2005 | Takeda et al. | 49/352 |
| 2005/0110298 A1 * | 5/2005 | Fin et al. | 296/146.5 |
| 2005/0115155 A1 * | 6/2005 | Ottino et al. | 49/502 |
| 2005/0166462 A1 * | 8/2005 | Losch et al. | 49/502 |
| 2005/0235574 A1 * | 10/2005 | Gomez Camara et al. | 49/502 |
| 2006/0000149 A1 * | 1/2006 | Radu et al. | 49/502 |

FOREIGN PATENT DOCUMENTS

| | | |
|---|---|---|
| DE | 19942644 A1 | 3/2001 |
| DE | 19942650 A1 | 3/2001 |
| EP | 1114256 B1 | 7/2002 |
| EP | 1212206 B1 | 8/2004 |
| GB | 262761 A | 7/1927 |
| WO | WO 00/11356 A1 | 3/2000 |
| WO | WO 01/15923 A1 | 3/2001 |
| WO | WO 01/89868 A1 | 11/2001 |

* cited by examiner

PRE-ASSEMBLY UNIT FOR A MOTOR VEHICLE DOOR

TECHNICAL FIELD

The present invention relates to a pre-assembly unit for a motor vehicle and for connection of such with a door frame of the motor vehicle. Such a pre-assembly unit is used by car builders in a motor vehicle and includes a window frame, a side window guided at least within the window frame, a window lifting mechanism which is connected to the side window in order to raise or lower it and an equipment carrier connected to but disconnectable from the window frame with a wet side and a dry side for dividing the door frame into a wet and a dry area. Furthermore, the present invention also relates to a motor vehicle door with such a pre-assembly unit as well as an assembly and disassembly method for such a motor vehicle door.

BACKGROUND

Up to now in the prior art motor vehicle doors have primarily been made up or assembled from individual parts, i.e. the motor vehicle door consists of an integrally designed window frame and door frame and is provided with the necessary components such as window lifting mechanism, side window, lock, etc. In some motor vehicle doors, equipment such as the window lifting mechanism or lock, for example, are also pre-assembled on an equipment carrier. In this case the equipment carrier is attached to the motor vehicle door with disconnectable fixing agents so that it is possible in a simple manner to detach the equipment carrier from the door structure (window frame and door frame) for maintenance or repair purposes.

However, at present developments are heading towards the creation of bigger and bigger pre-assembly units at the automobile manufacturer in order to keep assembly times on the (main) assembly line low. As a result efforts are also being made with a car door to design the majority of components as a pre-assembly unit.

DE 199 42 644 A1 and DE 199 42 650 A1 describe a pre-assembly unit. In the printed matter referred to, the window lifting mechanism is connected directly to the equipment carrier in order to stabilize and fix it in position. If the pre-assembly unit is inserted into the door frame of a motor vehicle, then the window frame is connected to the door frame on one hand and also by way of screwed connections with the equipment carrier on the other. The window lifting mechanism always remains connected to the equipment carrier alone. Thus the problem arising in the prior art in cases of repair or for disassembly that even if the fixing means for joining the equipment carrier to the window frame on one hand and to the door frame on the other can be undone, it is not possible to remove it separately (i.e. on its own) because the window lifting mechanism is permanently connected to the equipment carrier, i.e. it would be necessary either to remove the window lifting mechanism including side window or to separate the whole pre-assembly unit with the window frame from the door frame. However, it is not desirable to undo the connection between the window frame and the door frame once this connection has been made. Thus the disassembly procedure for the former variation is complicated or even not possible at all due to the cramped conditions, and the other disassembly procedure involves major expenditure in terms of time and money and, furthermore, disconnection of the window frame from the door frame is not desirable (for example because of the tolerances already set up, the seal disposed between them, etc.).

SUMMARY

Aspects of the invention are directed to creating a pre-assembly unit, which is improved by comparison with the prior art referred to above and which, despite a greater amount of pre-assembly, enables separate disassembly in a simple manner of the equipment carrier after joining of the pre-assembly unit to the door frame of the motor vehicle. Further, aspects of the invention are directed to providing an appropriate motor vehicle door plus an assembly and disassembly method for such door.

Embodiments of the present invention are referred to in the claims.

Thus aspects of the present invention are based on the idea that the equipment carrier, which in the vehicle door may serve on one hand as the carrier of structural elements, for example loud speakers, door opening elements, etc. as well as a partition of the door frame into a wet area and a dry area, may also be used on the other hand as an assembly aid for the window lifting mechanism. This makes it possible to pre-test the entire pre-assembly unit comprising the window frame, equipment carrier, side window and associated window lifting mechanism as a closed unit before it is delivered to the car builder. However, to facilitate maintenance and disassembly of the equipment carrier as a separate element even after final assembly, aspects of the invention are based on the idea that the joint between the window lifting mechanism and the equipment carrier should serve for the purposes of assembly, testing and transport of the pre-assembly unit and final joining of the window lifting mechanism may be made primarily to the motor vehicle's door frame.

The pre-assembly unit for a motor vehicle and for joining with a door frame of the motor vehicle according to one aspect of the present invention includes a window frame, a side window guided at least within the window frame, a window lifting mechanism which is connected to the side window in order to raise or lower it and an equipment carrier connected to but disconnectable from the window frame with a wet side and a dry side for dividing the door frame into a wet and a dry area. Furthermore, the pre-assembly unit according to one aspect of the invention includes at least one fixing means which joins the window lifting mechanism to the equipment carrier and can be undone from the dry side of said equipment carrier and in that at least one assembly preparation provided is formed on or in the window lifting mechanism which is accessible from the dry side of the equipment carrier for joining the window lifting mechanism to the door frame. This design may enable delivery of the pre-assembly unit as a completely pre-tested closed unit with window frame, side window and window lifting mechanism that is joined to the equipment carrier for this purpose.

According to aspects of the invention, this joint is designed to be disconnectable and said disconnection is from the dry side of the equipment carrier. In case of disassembly this makes it possible to remove the equipment carrier completely and separately once an interior door panel has been removed, i.e. all connections of the equipment carrier to the window frame, to the door frame and likewise connection of the equipment carrier to the window lifting mechanism are undone so that the equipment carrier can be taken off. As mentioned previously, however, the window lifting mechanism has an assembly preparation which makes it possible during assembly to join the window lifting mechanism to the door frame from the dry side of the equipment carrier. Consequently, after installation of the pre-assembly unit on the motor vehicle's door frame, there is also a permanent attachment of the window lifting mechanism on said door frame. On disassembly, during which the disconnectable fixing means of the window lifting mechanism on the equipment carrier is undone, the window lifting mechanism thus nevertheless remains fixed on the door frame so that misalignment or displacement may be minimized or avoided. Thus aspects of the present invention make it possible to provide a pre-assembly unit with a large amount of pre-assembly which includes at least the window frame, the side window, the window lifting mechanism and the equipment carrier and which may be tested as a closed unit, whereby with the pre-assembly unit installed in the motor vehicle's door frame, the equipment carrier may also be disconnected and removed as a separate element without other elements—with the possible exception of the interior door panel and/or related components—having to be removed first. Thus the pre-assembly unit according to one aspect of the invention enables separate disassembly of the equipment carrier in a simple manner and at the same time provides a closed pre-assembly unit with a large amount of pre-assembly that is capable of being tested.

In the case of window lifting mechanisms, two different mechanisms are known. One of these mechanisms is what is known as an external mechanism in which the side window is disposed between the wet side of the equipment carrier and one or more mounting channels on which a driving tab movable by means of a pulling agent (e.g. cable) is guided, said tab being connected to the side window and preferably also to the drive unit of the window lifting mechanism. In this case, the fixing means joins the window lifting mechanism (preferably the mounting channel(s) mentioned) to the equipment carrier by way of an angle element. In one embodiment, it is the angle element that facilitates a pre-assembly unit having at least the window frame, side window, external window lifting mechanism and equipment carrier. As mentioned, with an external window lifting mechanism the side window is disposed between the wet side of the equipment carrier and one or more mounting channels. Thus the space between the mounting channels and the equipment carrier that is taken up with moving the side window and pre-assembly of the mounting channels directly on the equipment carrier is not initially possible. Therefore, the angle element is used to enable a pre-assembly unit with the scope referred to above. The space between the equipment carrier and the mounting channels occupied by the movement of the side window is bridged by such an angle element that joins the mounting channel to the equipment carrier with a gap between. Consequently, in a pre-assembly door unit in which the equipment carrier, in another aspect of the invention, is not removable after assembly on the door frame, the angle element may facilitate such a pre-assembly unit. The angle element may be used in any suitable combination with other elements described herein or other elements. Thus the angle element represents an element which, even without the features of the fixing means and the assembly preparation, forms an independent inventive aspect. For example, the angle element may be S-shaped where the two top and bottom legs of the "S" are attached one to the mounting channel or rails of the window lifting mechanism and the other to the equipment carrier. Alternatively, the angle element might also be substantially U-shaped whereby the two legs of the "U" are to be attached directly or indirectly to the mounting channel(s) and the equipment carrier and the width of the section connecting the two legs would substantially correspond to the width of the space in which the side window is movable. In cases where the angle element is employed without the features referred to previously, attachment to the equipment carrier may be made non-disconnectable and likewise also the joint to the mounting channel(s). Designing the joint between the angle element and the equipment carrier so as to be disconnectable, that is by way of the fixing means, is a further aspect of the invention.

If the mechanism concerned is internal, i.e. the window pane moves on the side of the previously mentioned mounting channel or rails facing away from the wet side of the equipment carrier, then the fixing means may join the window lifting mechanism (preferably the mounting channel(s)) directly to the equipment carrier, i.e. without other additional components.

The fixing device or means may be any suitable attachment element as the present invention is not limited in this respect. According to one embodiment of the invention, the fixing means is a quick-release fastener. Quick-release fasteners are generally known in the prior art and are described for example as screw fasteners in EP 1 114 256 B1. Such quick-release fasteners may enable uncomplicated and fast disconnection of the joint between the window lifting mechanism and the equipment carrier as well as enabling fast joining during assembly of the pre-assembly unit.

Alternatively, the fixing means may also be a snap-off non-reusable connector. In other words, the joint between the window lifting mechanism and the equipment carrier is created once and it is destroyed on disassembly of the equipment carrier. As the window lifting mechanism is adequately fixed to the door frame, a renewed joint between the equipment carrier and the window lifting mechanism is no longer necessary on subsequent assembly of the equipment carrier.

A further alternative of the fixing means comprises a clip or screwed connection.

In one embodiment, the fixing means corresponds to a fixing means that creates the disconnectable joint between the equipment carrier and the window frame and/or the disconnectable joint between the equipment carrier and the door frame. Thus, in one embodiment, on disassembly of the equipment carrier, it is the same fixing means or component that must be undone every time, i.e. also the fixing means that joins the equipment carrier to the window lifting mechanism. Thus the same procedure and possibly the same tool may be employed, which may lead to improved handling.

According to an aspect of the present invention, access to the assembly preparation of the window lifting mechanism is achieved through an aperture that may be formed in the equipment carrier. This aperture may preferably be an aperture for attachment of a fixing means such as a quick-release screw fastener or other fixing arrangement, for example, which serves for disconnectable joining of the equipment carrier to the door frame.

To achieve adequate division of the door frame into a wet and dry area, in one embodiment, the equipment carrier comprises a circumferential seal.

The equipment carrier may be formed of any suitable material or combination of materials, as the present invention is not limited in the respect. In one embodiment, in the case of the equipment carrier, this seal may be a plastic part, such as a compact or foamed injection-molded part. Alternatively, however, the equipment carrier may also be designed as a metal part, such as a steel sheet, a sheet made from an aluminum alloy or a sheet made from a magnesium alloy. In a further alternative, the equipment carrier is a plastic and metal composite, which is manufactured by means of insert, outsert or hybrid technology or other suitable manufacturing methods.

Furthermore, in one embodiment, the exterior mirror, which may be installed on the window frame, is also included in the assembly of the pre-assembly unit. Moreover, the pre-assembly may also include seals for the door joint, faceplates and other elements, as desired.

As already mentioned, aspects of the present invention are also directed to a motor vehicle door with a pre-assembly unit referred to above, in which the window lifting mechanism is joined to the equipment carrier and by way of the fixing means to the door frame and in which the window frame as well as the equipment carrier are joined to the door frame.

In the assembly method according to one aspect of the invention for such a motor vehicle door, the pre-assembly unit is inserted into the door frame. The joints are made between the window frame and the door frame, between the equipment carrier and the door frame and between the window lifting mechanism and the door frame by way of a suitable connector such as the fixing means, whereby the last-mentioned procedure is carried out from the dry side of the equipment carrier.

On disassembly of an equipment carrier in such a motor vehicle door, apart from removing the interior door panel, the joint between the equipment carrier and the door frame and between the equipment carrier and the window frame is undone and likewise the connection between the equipment carrier and the window lifting mechanism, which can also be carried out from the dry side of the equipment carrier.

Further advantages and features of the present invention may be discerned from the following detailed description.

BRIEF DESCRIPTION OF THE DRAWINGS

The present invention will be described in greater detail in the following purely as an example on the basis of exemplary embodiments with reference to the accompanying drawings.

The drawings show.

The same reference numbers identify the same or similar elements in the different views.

DETAILED DESCRIPTION

Figure 1:
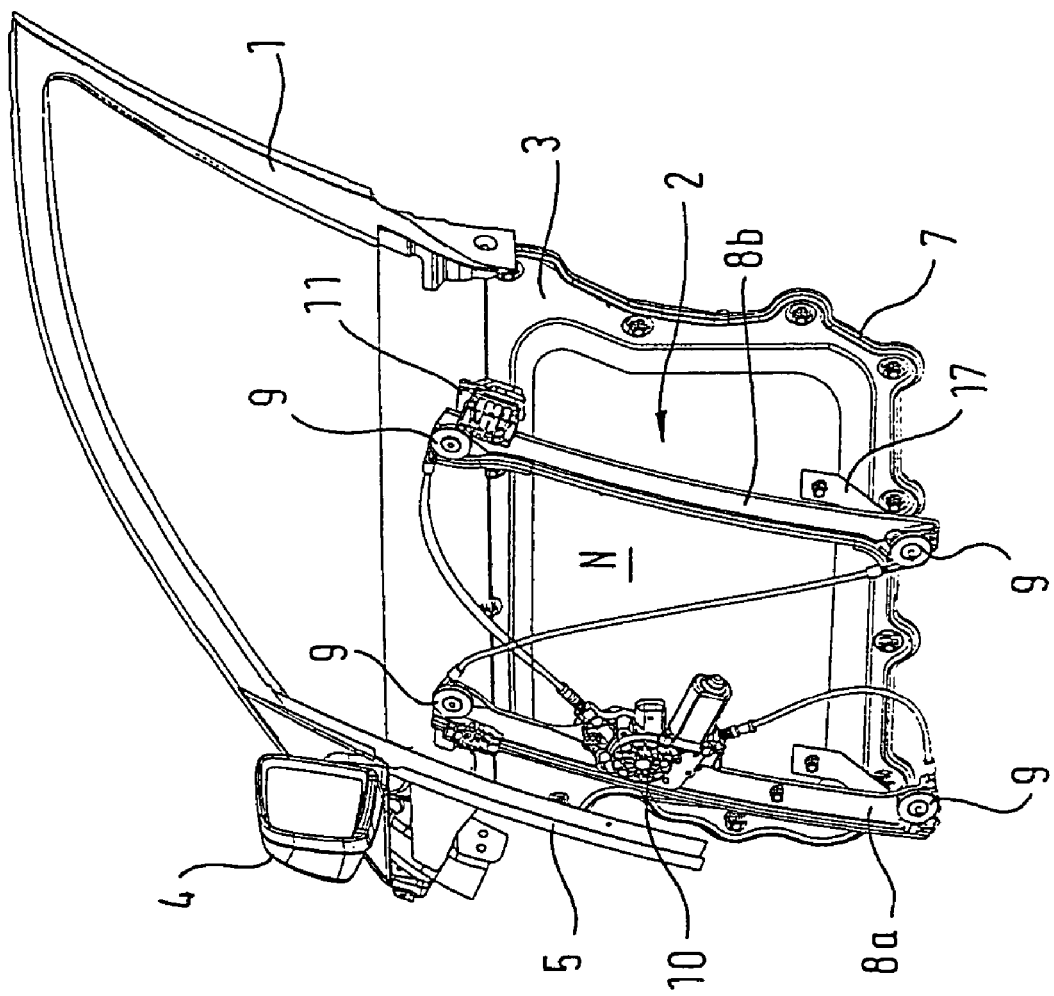
FIG. 1 is a pre-assembly unit for a motor vehicle according to an example of an embodiment of the present invention.

FIG. 1 shows a pre-assembly unit for a motor vehicle and for connection to a door frame of the motor vehicle according to an exemplary embodiment of the present invention. The pre-assembly unit has a window frame 1, a side window, which is not shown, that is guided at least within the window frame, a window lifting mechanism 2 and an equipment carrier 3.

As can be seen from the drawings, in the exemplary embodiment, window frame 1 comprises a window frame (which may be formed of sheet metal), a window channel, faceplates and seals. In addition, exterior mirror 4 of a motor vehicle is already attached to the window frame, although mirror 4 need not be employed, as the present invention is not limited in this respect. The side window (not shown) is guided in a mounting channel 5, said mounting channel being fixed to the window frame and extending beyond it.

Equipment carrier 3 may serve as a carrier for one or more further components, such as loudspeakers, elements for the door opener, cable harnesses, etc., although no additional components need be employed, as the present invention is not limited in this respect. Furthermore, equipment carrier 3 serves to divide door frame 6 (see FIG. 2) into a wet area and a dry area, whereby the dry area is the space which is disposed on the side (T) of the equipment carrier facing towards the passenger compartment, i.e. between the equipment carrier and an interior door panel not shown. The wet area (N) on the other hand lies between the equipment carrier and the outer door skin, i.e. the outer skin of door frame 6. To create this division, in one embodiment, equipment carrier 3 has a circumferential seal 7, such as a seal extending around the entire circumference.

Figure 2:
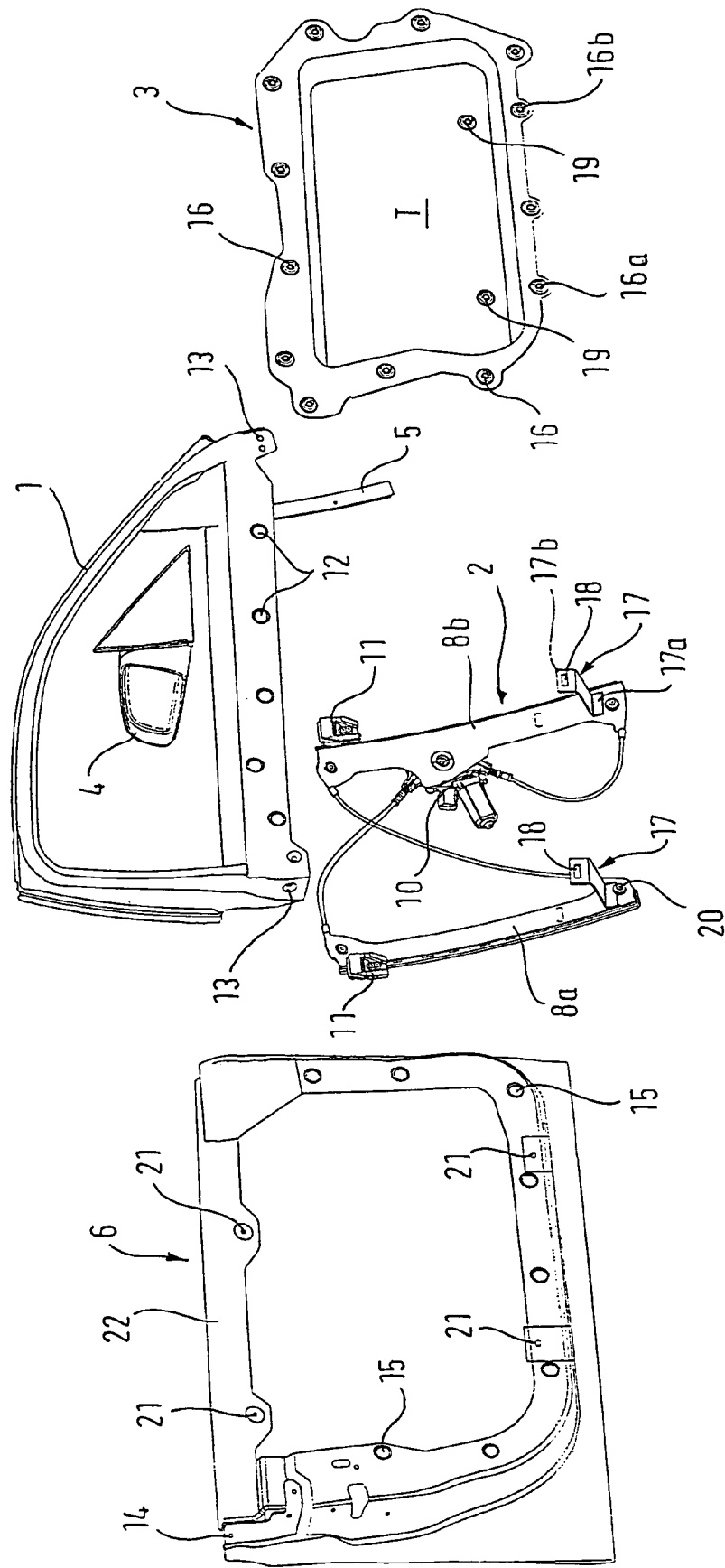
FIG. 2 is an exploded view of the pre-assembly unit from FIG. 1 including the door frame in which the pre-assembly unit is to be inserted.

Window lifting mechanism 2, as used in the exemplary embodiment of the present invention in FIGS. 1 and 2, is an "external" window lifting mechanism. It is made up of two mounting channels 8a and 8b on each of which a movable tab 11 is guided by means of a pulling agent (e.g. cable), said tab being connected to the side window. The pulling agent, a cable in the embodiment shown, runs around deflection rolls 9 which are each pivotably attached at the top and bottom ends of mounting channels 8a and 8b. The pulling agent is correspondingly driven via a motor 10 in order to move the tab not shown in such a way that the side window moves up or down. Although a motor 10 is employed in this embodiment, the present invention is not limited in this respect, as the pulling agent may be attached to other mechanisms, such as a manual rotor. Window lifting mechanism 2 is an external mechanism because the side window is moved in a space between mounting channels 8a and 8b and equipment carrier 3, i.e. with the window down, motor 10 as well as mounting channels 8a and 8b lie outside, that is between the side window and the exterior door skin (for example, the sheet of metal facing towards the outside).

FIG. 2 shows the elements explained with reference to FIG. 1 in an exploded view. In addition, the view onto the elements in FIG. 2 is from the side of the equipment carrier facing the passenger compartment side whereas the view in FIG. 1 is from the opposite side. It can be seen from FIG. 2 that, in this embodiment, the window frame has several circular cut-outs 12 in a section running horizontally. In addition, several fixing preparations 13 are also provided on window frame 1 which serve to join the window frame with corresponding fixing preparations 14 in door frame 6.

Furthermore, in one embodiment, several circular cut-outs 15 are also provided in door frame 6. Equipment carrier 3 has, for example, apertures for quick-release fasteners 16 such as are described in EP 1 114 256 B1. These quick-release fasteners 16 serve for disconnectable joining of equipment carrier 3 to window frame 1 and door frame 6. To do this, quick-release fasteners 16 engage in cut-outs 15 and 12 of door frame 6 and window frame 1 respectively and a connection is made by turning the quick-release fasteners. In this regard, shoulders of the fasteners grip behind the circumference of cut-outs 12 and 15. Although quick-release fasteners are described, the present invention is not limited in this respect, as other suitable fasteners may be employed.

As can also be seen from FIG. 2, the window lifting mechanism has two angle elements 17, which for example are firmly attached to mounting channels 8a, 8b of window lifting mechanism 2. These angle elements are configured in such a way in the exemplary embodiment shown that they roughly describe an "S" shape whereby one bottom leg 17a is joined to mounting channel 8b or 8a. This joint may be produced by welding, or screwing or employing any other suitable joining techniques.

A cut-out 18 may be provided in the other leg 17b. This cut-out 18 serves to make it possible to engage further quick-release fasteners 19 in equipment carrier 3, which may be the same as quick-release fasteners 16, in this cut-out or its circumference thus achieving an attachment of window lifting mechanism 2 to the equipment carrier that can be undone.

In addition, in one embodiment, rotary axes 20 of rolls 9 of window lifting mechanism 2 are hollow or include a through-hole and serve as assembly preparation for joining window lifting mechanism 2 to corresponding fixing preparations 21 in door frame 6.

The following section explains one embodiment of joining the elements the pre-assembly unit, as it is shown in FIG. 1. Attached to window frame 1 are exterior mirror 4 and equipment carrier 3. Joining of equipment carrier 3 to window frame 1 is effected in this embodiment by way of quick-release fasteners 16, which engage in cut-outs 12 of window frame 1. A side window, which is not shown, is guided in window frame 1 and is movable within channel 5. This side window is connected to tabs 11 which run on mounting channels 8a, 8b of window lifting mechanism 2. Window lifting mechanism 2 is not permanently joined to the window frame but is rather connected to equipment carrier 3 by way of angle elements 17. Quick-release fasteners 19, which engage in cut-outs 18 of angle elements 17 are shown as an example of a disconnectable fixing means for this purpose and bring about a disconnectable joint between equipment carrier 3 and window lifting mechanism 2. Quick-release fasteners may be replaced with other disconnectable connections, such as clip connectors, screwed connectors or even a snap-off (destructible) non-reusable connector, as the present invention is not limited in this respect. If the side window in the pre-assembly unit has been moved into the closed position, e.g. it is lying within channel 5 and in the window groove which runs around the window frame, then the joint between window lifting mechanism 2 and the equipment carrier by way of angle elements 17 is sufficient to achieve adequate fixing and location of window lifting mechanism 2.

In one embodiment, the amount of pre-assembly of the pre-assembly unit and fixing of window lifting mechanism 2 to equipment carrier 3 with the side window installed in window frame 1 results in the creation of a completely closed, pre-testable (e.g. window lifting mechanism with side window in channel 5) pre-assembly unit which merely has to be inserted and installed in door frame 6, for example at the motor vehicle assembly plant. However, it should be appreciated that the present invention is not limited in this respect as more or fewer components may be pre-assembled.

The following section explains one example of an installation procedure of one embodiment of the pre-assembly unit in a door frame 6 of a motor vehicle. In this case, reference will be made to FIG. 2.

The pre-assembly unit shown in FIG. 1 is inserted in door frame 6 and the window frame 1 and door frame 6 are joined. As mentioned, fixing preparations 13 and 14 join the frames. A seal (not shown) is placed between the window frame 1 and door frame 6 to seal the joint. Then window frame 1 is aligned with door frame 6. In one embodiment of the procedure, once this connection between window frame 1 and door frame 6 is made, it is desirable not to disconnect these frames.

Subsequently, window lifting mechanism 2 is connected at one point at least, and in one embodiment, at all four points, with corresponding preparations 21 in door frame 6, and in one embodiment, screwed together, by means of hollow rotary axes 20 of rolls 9. In other words the hollow rotary axes of rolls 9 serve as assembly preparation 20. These hollow rotary axes 20 are accessible according to an aspect of the invention from the dry side T of the equipment carrier. Advantageously, accessibility is enabled in that the quick-release fasteners, lying opposite hollow rotary axes 20 (identified in FIG. 2 by 16a and 16b), are removed resulting in cut-outs or apertures (openings) in equipment carrier 3 through which it is possible to bring about a screwed connection between window lifting mechanism 2 and door frame 6 on the two bottom hollow rotary axes 20 of rolls 9. In one embodiment, the quick-release fasteners for the joint with the window frame 1 can be positioned in such a way that they lie opposite fixing preparations 21 in reinforcing beam 22 of the door frame so that, with the quick-release fasteners removed, the top hollow rotary axes 20 also become accessible from the equipment carrier's dry side T. Alternatively, however, in one embodiment, only one aperture in the equipment carrier is provided, which makes the assembly preparation (hollow rotary axis) accessible. In one embodiment, this aperture is sealed after the assembly procedure with a molded elastomer part.

When window lifting mechanism 2 has been fixed to door frame 6, in one embodiment, remaining screw fasteners 16 are inserted and engage in cut-outs 15 of door frame 6 to join equipment carrier 3 to it in a disconnectable manner.

Figure 3:
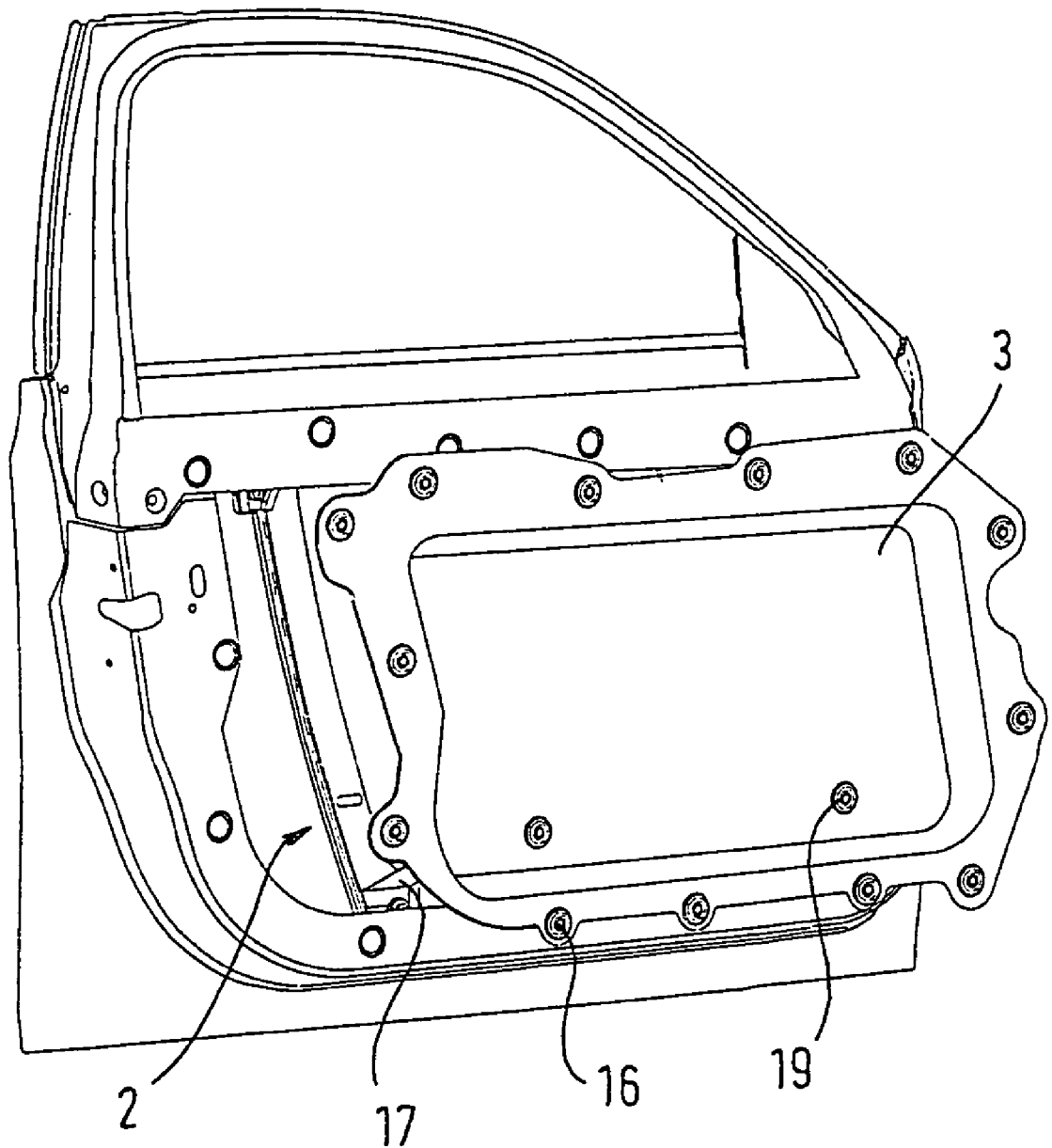
FIG. 3 is a motor vehicle door with a pre-assembly unit according to an aspect of the invention in which the equipment carrier is removed as a separate unit.

Thus a motor vehicle door as shown in FIG. 3 is created. In the following section, one example of a disassembly procedure of the equipment carrier as a separate unit will be explained. If it is necessary for maintenance or other purposes to remove equipment carrier 3 from the motor vehicle door, in one embodiment, only quick-release fasteners 16 and 19 are undone. The joint between equipment carrier 3 and window lifting mechanism 2, which is created by way of angle elements 17, is also undone. However, in one embodiment, as window lifting mechanism 2 is fixed by way of the permanent joint (screwed joint) to door frame 6 with fixing preparations 21 by means of hollow rotary axes 20 of rolls 9, it remains in its position even though its connection to equipment carrier 3 has been undone.

According to an aspect of the present invention, the equipment carrier thus fulfils a triple function: it serves as a carrier for further structural components such as has been explained above; it divides the door frame into wet area N and dry area T; and, it serves as a pre-assembly carrier for window lifting mechanism 2. As the joint with window lifting mechanism 2 is designed to be undone from the dry side (T) of the equipment carrier, equipment carrier 3 may, however, despite this pre-assembly, be removed as a separate element after the pre-assembly unit has been joined to the door frame. In one embodiment where the fixing means (such as quick-release fastener 19) that joins equipment carrier 3 to window lifting mechanism 2 is the same as the fixing means (such as fixing means 16) that join equipment carrier 3 to window frame 1 and door frame 6, then during this procedure, the same action and same tool may be employed. However, the present invention is not limited in this respect, as quick-release fastener 16 need not be identical to quick-release fastener 19. In addition, the fixing means need not be a quick-release fastener, as other fixing means, as previously explained, may also be used, as the present invention is not limited in this respect. However, as mentioned, according to one embodiment of the invention, the fixing means are undone from the dry side of the equipment carrier.

In one embodiment, even after removing equipment carrier 3 as a separate unit, window lifting mechanism 2 still remains fixed in its position because it is fixed to door frame 6 by means of its assembly preparation. This joint can be created in any suitable manner, and, in one embodiment, the assembly preparation should be accessible from the dry side T of equipment carrier 3 in order to carry out this fixing after inserting the pre-assembly unit into door frame 6. It is also not imperative to provide the assembly preparation by means of hollow rotary axes 20 of rolls 9. It is also possible to merely provide a cut-out in mounting channels 8*a* and 8*b*.

In one embodiment, if an internal window lifting mechanism is employed, then angle element 17 may also be dispensed with, as the side window already runs between mounting channels 8*a* and 8*b* and the outer door skin.

It should also be noted in addition that when replacing equipment carrier 3, for example after maintenance work, it is not absolutely necessary to recreate the joint with window lifting mechanism 2 because it is already fully attached to door frame 6. For example, in one embodiment, the lifting mechanism 2 is screwed to the door frame 6.

Thus, one or more aspects of the present invention may be employed to facilitate a relatively large amount of pre-assembly where, in one embodiment, equipment carrier 3 can nevertheless be removed as a single unit from the completely pre-assembled motor vehicle door without a complicated procedure being necessary and/or without window lifting mechanism 2 having to be removed with it.

It shall be understood that the present invention is not restricted to the exemplary embodiments described above but may be appropriately modified and adapted within the scope of its claims.

The invention claimed is:

1. Pre-assembly unit for a motor vehicle and for connection with a door frame of the motor vehicle, the pre-assembly unit comprising:
   a window frame comprising first cutouts, the window frame being separate from but connectable with the door frame;
   an equipment carrier that is connected to but disconnectable from the window frame via first quick-release fasteners engaged within the first cutouts of the window frame and the equipment carrier being connectable to the door frame via second quick-release fasteners engagable within second cutouts of the door frame, the equipment carrier having a wet side (N) and a dry side (T) for dividing the door frame into a wet area and a dry area;
   a side window guided at least within the window frame;
   a window lifting mechanism, which is connected to the side window in order to raise or lower the side window, the window lifting mechanism comprising attachment legs and rolls;
   at least one fixing means for joining the window lifting mechanism to the equipment carrier, said fixing means adapted to be undone from the dry side of the equipment carrier, the fixing means comprising third quick-release fasteners coupling the equipment carrier to attachment legs of the window lifting mechanism; and
   wherein the window lifting mechanism is attachable to the door frame from the dry side of the equipment carrier, at least one of the second quick release fasteners is removable from the equipment carrier to expose an aperture that provides access to the window lifting mechanism such that the window lifting mechanism is attachable to the door frame via screws mating with hollow rotary axes of the rolls of the window lifting mechanism wherein the window lifting mechanism is independently connectable to the door frame such that upon removing the equipment carrier from the door frame, the window lifting mechanism can remain connected to the door frame.

2. Pre-assembly unit according to claim 1, in which the window lifting mechanism is an external mechanism and the fixing means joins the window lifting mechanism indirectly to the equipment carrier by way of an angle element.

3. Pre-assembly unit according to claim 1, in which the window lifting mechanism is an internal mechanism.

4. Pre-assembly unit according to claim 1, in which the fixing means creates a disconnectable joint between the equipment carrier and the window frame, thereby enabling the equipment carrier to be joined disconnectably to the door frame.

5. Pre-assembly unit according to claim 1, in which the equipment carrier comprises a circumferential seal.

6. Pre-assembly unit according to claim 5, in which the circumferential seal comprises plastic, formed as one of a compact and foamed injection molded part.

7. Pre-assembly unit according to claim 1, in which the equipment carrier is formed from one of a steel sheet, a sheet made from an aluminum alloy, and a sheet made from a magnesium alloy.

8. Pre-assembly unit according to claim 1, in which the equipment carrier is a plastic and metal composite, with the composite being formed by one of an insert, outsert or hybrid procedure.

9. Pre-assembly unit according to claim 1, in which an exterior mirror is attached to the window frame.

10. Pre-assembly unit according to claim 1, in combination with a motor vehicle door, in which the window lifting mechanism is joined to the door frame and to the equipment carrier by way of the fixing means and in which the window frame and the equipment carrier are joined to the door frame.

11. Assembly method for a motor vehicle door according to claim 10 comprising the acts of:
   inserting the pre-assembly unit into the door frame;
   joining the window frame to the door frame;
   joining the equipment carrier to the door frame; and
   joining the window lifting mechanism to the door frame from the dry side (T) of the equipment carrier.

12. Disassembly method for an equipment carrier in a motor vehicle door according to claim 10, comprising the acts of:
   disconnecting the connections of the equipment carrier to the door frame and the window frame; and
   disconnecting the connection of the equipment carrier to the window lifting mechanism from the dry side (T) of the equipment carrier.

13. An apparatus for connection with a door frame of a motor vehicle, the apparatus comprising:
   a window frame comprising first cutouts, the window frame being separate from but connectable with the door frame;
   an equipment carrier releasably connectable to the window frame via first quick-release fasteners engaged within first cutouts of the window frame and the equipment carrier being connectable to the door frame via second quick-release fasteners engageable within second cutouts of the door frame, wherein the equipment carrier is adapted to divide the door frame into a wet side and a dry side;
   a window lifting mechanism connectable to a side window and adapted to raise and lower the side window within the window frame when the side window is connected to the window lifting mechanism the window lifting mechanism comprising attachment legs and rolls;
   at least one attachment element releasably joining the window lifting mechanism to the equipment carrier, said at least one attachment element being arranged relative to the equipment carrier such that said at least one attachment element is releasable from the dry side, the attachment element comprising third quick-release fasteners coupling the equipment carrier to the attachment legs of the window lifting mechanism; and wherein the window lifting mechanism is attachable to the door frame from the dry side, at least one of the second quick release fasteners is removable from the equipment carrier to expose an aperture that provides access to the window lifting mechanism such that the window lifting mechanism is attachable to the door frame via screws mating with hollow rotary axes of the rolls of the window lifting mechanism, wherein the window lifting mechanism is independently connectable to the door frame such that upon removing the equipment carrier from the door frame, the window lifting mechanism can remain connected to the door frame.

14. Pre-assembly unit for a motor vehicle and for connection with a door frame of the motor vehicle, the pre-assembly unit comprising:

a window frame comprising first cutouts;

an equipment carrier connected to but disconnectable from the window frame via first quick-release fasteners engaged within the first cutouts of the window frame and the equipment carrier being connectable to the door frame via second quick-release fasteners engageable within second cutouts of the door frame, the equipment carrier having a wet side (N) and a dry side (T) for dividing the door frame into a wet area and a dry area;

a side window guided at least within the window frame;

a window lifting mechanism, which is connected to the side window in order to raise or lower the side window, the window lifting mechanism comprising attachment legs and rolls; and at least one fixing means for joining the window lifting mechanism to the equipment carrier, said fixing means adapted to be undone from the dry side of the equipment carrier, the fixing means comprising third quick-release fasteners coupling the equipment carrier to the attachment legs of the window lifting mechanism; and wherein the window lifting mechanism is attachable to the door frame from the dry side of the equipment carrier, at least one of the quick second release fasteners is removable from the equipment carrier to expose an aperture that provides access to the window lifting mechanism such that the window lifting mechanism is attachable to the door frame via screws mating with hollow rotary axes of the rolls of the window lifting mechanism, wherein the window lifting mechanism is independently connectable to the door frame such that upon removing the equipment carrier from the door frame, the window lifting mechanism can remain connected to the door frame.

* * * * *

UNITED STATES PATENT AND TRADEMARK OFFICE
CERTIFICATE OF CORRECTION

| | | |
|---|---|---|
| PATENT NO. | : 7,774,986 B2 | Page 1 of 1 |
| APPLICATION NO. | : 11/230939 | |
| DATED | : August 17, 2010 | |
| INVENTOR(S) | : Klaus Unterreiner et al. | |

It is certified that error appears in the above-identified patent and that said Letters Patent is hereby corrected as shown below:

In the Claims:

At column 12, line 15, claim 14 please delete the word "quick" and insert it after the word "second".

Signed and Sealed this

Fifth Day of October, 2010

David J. Kappos
*Director of the United States Patent and Trademark Office*